F. WELS.
FLYING MACHINE.
APPLICATION FILED FEB. 11, 1913.
1,154,466.
Patented Sept. 21, 1915.
3 SHEETS—SHEET 1.
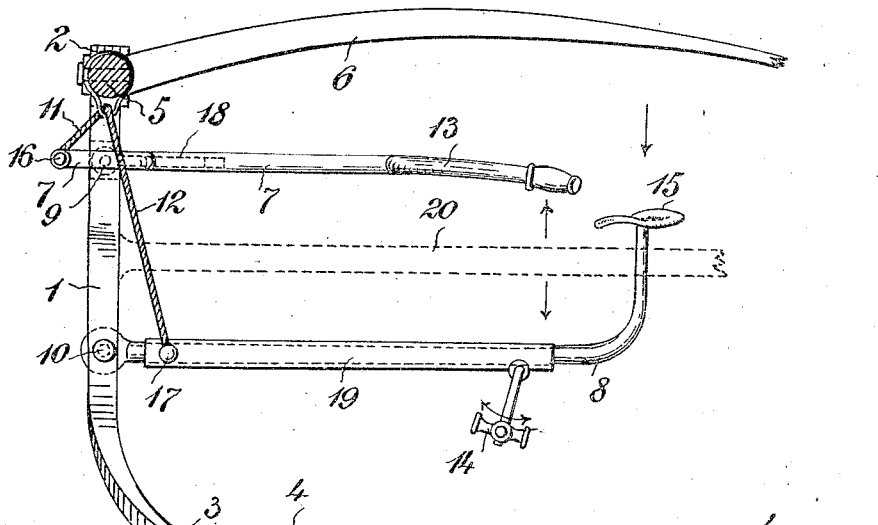
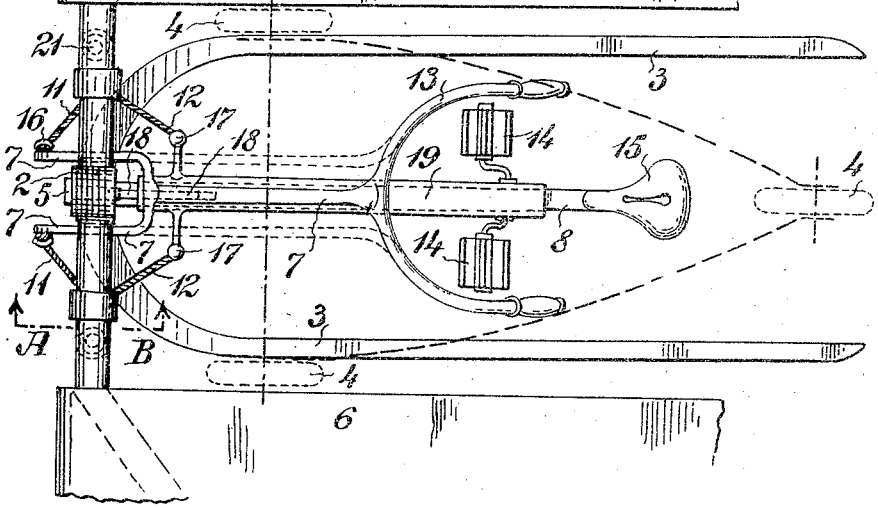

F. WELS.
FLYING MACHINE.
APPLICATION FILED FEB. 11, 1913.
1,154,466.
Patented Sept. 21, 1915.
3 SHEETS—SHEET 2.
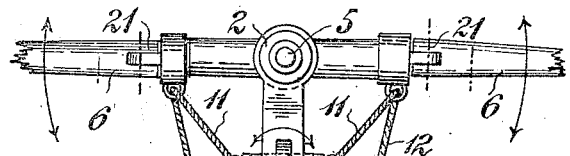
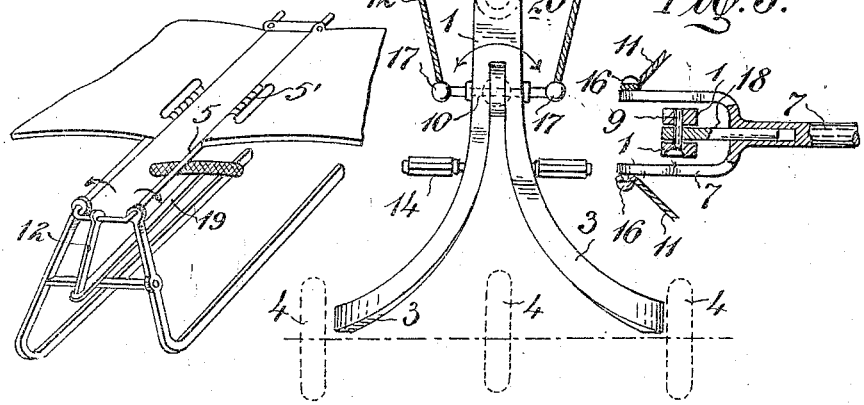
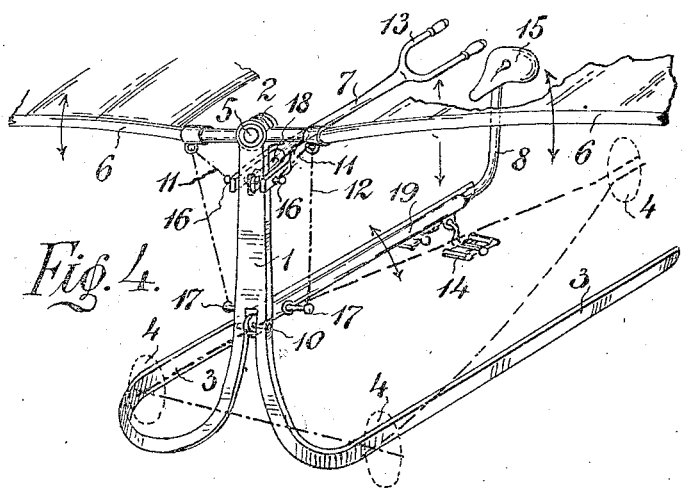

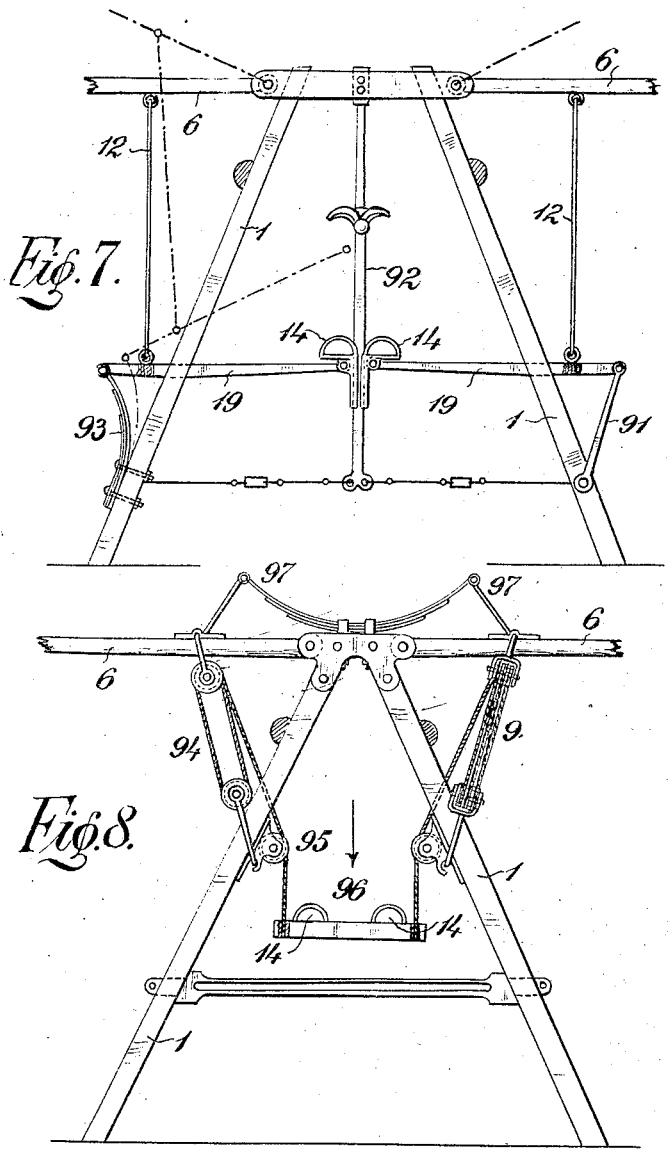

UNITED STATES PATENT OFFICE.

FRANZ WELS, OF VIENNA, AUSTRIA-HUNGARY.

FLYING-MACHINE.

1,154,466.   Specification of Letters Patent.   Patented Sept. 21, 1915.

Application filed February 11, 1913. Serial No. 747,775.

*To all whom it may concern:*

Be it known that I, FRANZ WELS, a subject of the Emperor of Austria-Hungary, residing at Vienna, Empire of Austria-Hungary, have invented certain new and useful Improvements in Flying-Machines; and I do hereby declare the following to be a full, clear, and exact description of the invention, such as will enable others skilled in the art to which it appertains to make and use the same.

This invention relates to flying machines and is based on the idea that a flying machine actuated by the reciprocating movement of wings can be operated in a manner resembling the flight of birds only if at any moment of the flight the apparatus is automatically maintained in equilibrium, that is to say, that no particular power need be exerted by the pilot or by the motor for keeping the wings in the position of equilibrium. For securing this state of equilibrium the weight of the load rests on or is suspended from transmission elements mounted in the frame of the flying machine which transmit the action of the said weight on the wings in such a manner that this weight tends to turn the wings in a direction opposite to that in which the resistance of air acting on the underside of the wings tends to turn them. Moreover these transmission elements are so constructed and arranged that by suitably actuating them either by the muscular power of the pilot or by the motor, the movements required for the raising, the forward movement and the steering are imparted to the wings.

In the partly diagrammatical drawing, Figure 1 is a side elevation, partly in section on the line A—B, of Fig. 2. Fig. 2 is a plan view. Fig. 3 is a front elevation and Fig. 4 a perspective view of one constructional form of the apparatus embodying the invention shown by way of example. Fig. 5 illustrates a detail. Figs. 6 to 8 show modifications of the flying machine embodying my invention.

In the upper front portion 2, Figs. 1 to 5, of the frame 1 which in its lower portion is provided with runners or it may also be with running wheels, a shaft 5 is mounted which in the horizontal flight of the apparatus is itself horizontal, and the frame wings 6 of any suitable shape and curvature are located symmetrically in the frame and are mounted to rock on the shaft 5.

In the front part or bow of the frame 1 two levers 7, 8 are provided, each of them being adapted to turn around an axis 9 and 10 respectively fixed in the frame, each of such levers carrying lateral studs 16, 17 connected by links, ropes or the like 11, 12, to the wings at points on the latter which are located on opposite sides of and symmetrically to the shaft 5 so that when the levers 7, 8 are simultaneously moved in opposite directions, both of them act through the medium of the elements 11, 12 on the wings 6 to turn the latter around shaft 5 in the same direction. Of the two levers the one (7) constitutes a two armed, the other (8) a one armed lever. The rear end of the lever 7 carries, as shown, a yoke 13 on which act the hands of the pilot and the rear end of the lever 8 carries treadles 14 for the feet of the pilot to rest upon and a seat 15 for the pilot.

If the connections 11, 12 between the levers 7, 8 and the wings consist of links, universal joints are used but if, as shown in the drawing, the connection is brought about by ropes, wires or chains, such ropes or the like are preferably led from the studs 16 through eyes on the wings to the studs
17. If this condition is fulfilled the links 11, 12 may also be attached to different points of the wings in the direction of their length or width and the simultaneous strokes of the levers 7 and 8 may be different. Let it be assumed that the wings are inclined upward and outward as they are when at rest on the ground or at certain moments during flight. If now the pilot, catching hold of the yoke 13 with his hands and putting his feet on the treadles 14 stretches himself, raising himself, of course, from the seat 15 the two levers 7, 8 will turn in the frame simultaneously in opposite directions and consequently the wings 6 will be turned by both levers through the medium of the elements 11, 12 in the same direction, that is to say, downward, whereby the apparatus receives an upwardly directed impulse. In this movement the center of gravity of the pilot does not change its position. The return movement of the wings is brought about by merely relaxing the muscular exertion (stretching) as during flight the wings are always subjected to pressure from below owing to the upwardly directed resistance of the air. In the downward movement of the wings the whole system receives two impulses of motion, one of which directly overcoming gravity represents a component of upward movement, while the other is in the horizontal direction of movement. In the return or upward movement of the wings the system which is under the action of inertia will retain its forward movement.

It is obvious that at every moment the weight of the pilot acts upon the wings through the medium of the elements 11, 12 and tends to turn them downward, so that the pilot need not make any special exertion for overcoming the air pressure acting on the wings from below and tending to turn them upward (that is to say need not perform any floating work) but has to exert only that power which is required for bringing about the rocking movement of the wings. Applicant concludes from experiments made by him that the exertion of power is not too great owing to the leverage which has to be selected according to the length and area of the wings so that the wings may be operated by any person of normal constitution without undue effort. More particularly with very long wings an almost effortless floating is possible.

During flight the resistance of the air acting on the wings prevents a too rapid sinking. The pilot may accelerate the movement of the levers 7 and 8 toward each other and hence also the rising of the apparatus by the power of his muscles and thus cause the flying machine to rise or sink by a more rapid or a slower succession respectively of the movements of the levers 7 and 8.

The lateral steering is insured according to this invention by making the stroke of one wing greater or smaller than that of the other. For this purpose the points of attachment of the elements 11 and 12 are arranged on the studs 16, 17 which are adapted to turn around the longitudinal axes of the levers 7 and 8. This may be done for instance by securing the studs 17 on a sleeve 19 carrying also the treadles 14 and adapted to turn on the lever 8 or by securing the studs 16 to the lever 7 and journaling this lever on a pin 18 secured to the axis 9 and engaging a longitudinal hole in the lever 7 as shown in Fig. 5. Instead of a single lever 7 a pair of levers may be provided in such a manner that either both of such levers are rocked to the same extent, or that by more energetic contraction of the one or the other arm and leg of the pilot, the one or the other lever is rocked to a greater extent than the other, so that thereby the one or the other wing is accelerated or retarded in its operation.

When the right foot and the right hand of the pilot act more forcibly against the corresponding treadle and arm of the yoke 13 these will be moved to a greater extent than those on the opposite side, the studs 16 and 17 being turned to correspond. The right wing 6 strikes downward more vigorously than the left one and thus the forward movement on the right hand side will exceed that on the left hand side so that the flying machine will turn to the left. A rudder for vertical steering resembling a bird's tail may be mounted in a suitable manner and position on the frame or saddle as indicated in dotted lines in Fig. 1 by way of example. The hereinbefore described flying machine may also be operated by a plurality of persons seated side by side or the one behind the other operating the same levers 7 and 8 or separate levers. The wings may also be adapted to rock around an axis transverse to the direction of flight, i. e. on the axes 21.

As shown in Fig. 6 the lever for the hands might be entirely dispensed with and the flying machine might be operated by the feet of the pilot only, his hands catching hold of the bars 5'. The foot lever is pivotally connected to one or more links 12 which in turn are suitably connected to the shafts of the wings. In all of these modifications also a plurality of pairs of wings might be mounted on the same shafts. Also two or more persons in the flying machine might operate one foot or hand lever or one treadle might be provided for each foot of the pilot, such treadle acting through the medium of suitable transmission elements on the wings; this also permits to impart different strokes to the two wings of each pair.

In the modification shown in Fig. 7 the foot levers 19 serving for operating the wings 6 are not directly fulcrumed in the frame but on intermediary elements, such as links 91 mounted in the frame 1 the ends of the foot levers carrying the treadles 14 are guided in guides 92 fixed in the frame. Links 12 serve for connecting the wings with the foot levers 19. Instead of links 91 pivoted in the frame, a spring 93 might be used as shown on the left hand side of Fig. 7 having one of its ends secured to the frame while to its other end the foot lever 19 is pivoted. In this arrangement the feet of the pilot need not move along arcs of circles when depressing the treadles (as in the case when the foot levers are pivoted in the frame) but move along straight lines owing to the guide 92. Furthermore this modification permits of a much greater freedom in the arrangement of the links and levers for the purpose of obtaining the leverage desired. Different strokes may be imparted to the two foot levers for obtaining the different strokes of the wings required for steering or stabilizing.

In the modification shown in Fig. 8 pulley blocks 94 are substituted for the foot levers, the free ends of the ropes carrying the movable load or treadles 14. The fixed pulleys of the pulley block are supported in the frame 1 and the movable pulleys act on the wings 6. Of course the rope leading to the treadles 14 may pass over guide rollers 95. The two treadles 14 may be secured to a rod connecting the free ends of the ropes of the pulley blocks or they may be arranged as shown at 96 for avoiding dangling, or the treadles may be guided—each separately—parallel to each other. The return or upward movement of the wings may be facilitated by springs as indicated at 97. This applies also to all the modifications hereinbefore set forth. Of course any kind of pulley blocks may be used (ordinary Archimedian, differential pulley blocks and others). Further the above explained modes of operation may also be applied to the hand levers. Instead of levers and pulleys block connections, other gears, such as toothed segments, wedges and screws, hydraulic gears electric transmission, etc., might be used.

Claims:

1. In a flying machine the combination of a frame; wings fulcrumed on the frame; levers fulcrumed on the frame; and means connecting said levers and wings, and the points of connection of said means being on opposite sides of said lever fulcrums, substantially as described.

2. In a flying machine the combination of a frame; wings fulcrumed on the frame; a lever fulcrumed on the frame; a saddle mounted on said lever; a hand operated lever fulcrumed on the frame at a point above the fulcrum of the first named lever; and means connecting said levers and wings, and the points of connection of said means being on opposite sides of said lever fulcrums, substantially as described.

3. In a flying machine the combination of a frame, rocking wings, two levers fulcrumed in the frame, studs projecting laterally from such levers and adapted to turn around the longitudinal axes of such levers, means for connecting such studs to the wings whereby simultaneous movements of the two levers in opposite directions act to move the wings in the same direction.

In testimony whereof, I affix my signature, in presence of two witnesses.

FRANZ WELS.

Witnesses:
ARTHUR BAUMANSBURG,
AUGUST FUGGER.